(12) United States Patent
Hörner et al.

(10) Patent No.: US 10,509,384 B2
(45) Date of Patent: Dec. 17, 2019

(54) PROGRAMMABLE LOGIC CONTROLLER

(71) Applicant: SICK AG, Waldkirch/Breisgau (DE)

(72) Inventors: Sebastian Hörner, Staufen (DE);
Sebastian Brunsch, Mahlberg (DE);
Markus Saumer, Friesenheim (DE)

(73) Assignee: SICK AG, Waldkirch/Breisgau (DE)

( * ) Notice: Subject to any disclaimer, the term of this patent is extended or adjusted under 35 U.S.C. 154(b) by 92 days.

(21) Appl. No.: 15/825,634

(22) Filed: Nov. 29, 2017

(65) Prior Publication Data

US 2018/0157234 A1 Jun. 7, 2018

(30) Foreign Application Priority Data

Dec. 7, 2016 (EP) .................................... 16202701

(51) Int. Cl.
*G05B 19/05* (2006.01)
(52) U.S. Cl.
CPC .. *G05B 19/054* (2013.01); *G05B 2219/15097* (2013.01)
(58) Field of Classification Search
CPC ........ G05B 19/054; G05B 2219/25359; G05B 2219/15097; G01D 21/00
USPC ....................................................... 326/136
See application file for complete search history.

(56) References Cited

U.S. PATENT DOCUMENTS

| 6,018,700 A | 1/2000 | Edel |
| 2011/0291488 A1 | 12/2011 | Paik et al. |
| 2014/0013851 A1* | 1/2014 | van Liempd .......... G01H 11/06 73/658 |
| 2015/0066108 A1* | 3/2015 | Shi ..................... A61N 1/36125 607/59 |

FOREIGN PATENT DOCUMENTS

| DE | 102008036554 A1 | 2/2010 |
| EP | 1022702 A2 | 7/2000 |
| EP | 2685220 A2 | 1/2014 |
| EP | 2649496 B1 | 12/2015 |
| JP | 2015031582 A | 2/2015 |

OTHER PUBLICATIONS

European office action dated Jun. 19, 2017 for corresponding application EP 16202701.5.

* cited by examiner

*Primary Examiner* — Don P Le
(74) *Attorney, Agent, or Firm* — Nath, Goldberg & Meyer; Jerald L. Meyer; Stanley N. Protigal

(57) ABSTRACT

The invention relates to a programmable logic controller having an energy supply that provides electric energy to operate the unit and having at least one measurement input, with the measurement input being configured to measure and/or detect an electrical input signal. The programmable logic controller is characterized in that at least some of the electric energy of the input signal is supplied to the energy supply.

11 Claims, 2 Drawing Sheets

PROGRAMMABLE LOGIC CONTROLLER

FIELD

The present invention relates to an electrical unit, namely to a programmable logic controller (also "PLC" in the following), comprising
- an energy supply that provides the electric energy for operating the PLC; and
- at least one measurement input, wherein the measurement input is configured to measure and/or detect an electrical input signal.

BACKGROUND

Such electrical units, in particular in the form of programmable logic controllers, are generally known and serve, for example, to monitor, control and regulate industrial production processes. Sensor data or switching signals are e.g. evaluated by the PLC by means of the measurement input or by means of a plurality of measurement inputs for this purpose.

The measurement inputs require a predefined minimum voltage and/or a predefined minimum current of the electrical input signal to detect a high level. The high level can, for example, indicate that a switch has been closed.

Due to the required minimum voltage and the required minimum current, the electrical input signal has a not insubstantial electric energy that has to be dissipated in the unit/PLC and is e.g. converted into heat. A high electrical power can thus in particular result on a use of a plurality of measurement inputs that has to be converted into heat and has to be led off from the electrical unit. This can have the result at higher environmental temperatures, for example, that all the measurement inputs of the unit or of the PLC can no longer be used ("derating").

A measurement transducer is known from EP 1 022 702 A2 that uses an electrical measurement signal for the energy supply of its operation. A further sensor self-supplying with energy is known from U.S. Pat. No. 6,018,700 A.

SUMMARY

It is the underlying object of the invention to provide an electrical unit that can be operated without switching off or without derating measurement inputs.

This object is satisfied in accordance with the invention by a PLC in which an energy supply that provides the electric energy for operating the PLC, and a plurality of measurement inputs that are each coupled to a separate converter unit. Each converter unit is electrically connected to the energy supply and supplies at least some of the electric energy of the respective input signals to the energy supply. At least one measurement input is configured to measure and/or detect an electrical input signal. The PLC is configured in accordance with the invention to supply at least some of the electric energy of the input signal to the energy supply. At least some of the electric energy of the input signal can therefore be used for operating the PLC.

The invention makes it possible that the electric energy of the input signal can be sensibly used to e.g. operate internal consumers in the PLC or the PLC itself, whereby the conversion of the electric energy of the input signal into heat is suppressed or reduced. The total power loss in the PLC is hereby reduced, whereby the inherent heating up is also reduced, which in turn increases the service life of the PLC. In addition, smaller programmable logic controllers are possible due to the smaller inherent heating up, i.e. the packing density of e.g. the PLC can be increased. Finally, no measurement inputs have to be switched off or remain unused even at higher environmental temperatures since the input signals only contribute to the heating up of the PLC to a small extent.

It is furthermore of advantage that the input signals can conduct higher currents, whereby a more robust signal detection can be achieved. The input signals are then less sensitive to electromagnetic disturbances.

Different aspects of the PLC in accordance with the invention will be explained in even more detail in the following.

The energy supply can, for example, be an electric network in the PLC that conducts a supply voltage. The energy supply can conduct a DC voltage and/or can supply different electrical consumers of the PLC such as a processing unit, a display, input and output interfaces and the like with electric energy (i.e. with the supply voltage). The energy supply can, for example, comprise a bus bar to which electrical consumers can be connected. The energy supply can furthermore be coupled to a mains adapter that supplies electric energy from a low voltage network (with e.g. 230 V or 110 V) to the energy supply. The mains adapter can be configured to feed excess electric energy of the PLC into the low voltage network. A feed into the low voltage network can be sensible when the energy emanating from the input signals cannot be used in the PLC.

The measurement input can be an input that measures or detects an electrical input signal. The PLC, for example, generates a measured value that correlates with the input signal. The electrical input signal can e.g. originate from a temperature sensor, an emergency stop switch, a light grid, a laser scanner and the like.

Advantageous further developments of the invention can be seen from the description, from the drawings and from the claims.

In accordance with a first advantageous embodiment, the PLC comprises a sensor that is electrically connected to the measurement input and that provides the input signal. The sensor can be arranged outside a housing of the PLC. The input signal therefore comes from the sensor and/or is generated or at least influenced by the sensor. The sensor can modulate the input signal e.g. in dependence on a measured parameter (e.g. temperature or approach of an object). A sensor in the form of a switch can, for example, switch the input signal over from a low level (i.e. no current flow) to a high level (a predefined minimum current flows into the measurement input) to signalize that the switch has been pressed. The electric energy of the input signal conducted to the measurement input from the sensor is then prepared by the PLC such that at least some of the electric energy of the input signal can be supplied to the energy supply.

In accordance with a further advantageous embodiment, the PLC comprises at least one output that is configured to provide an electrical output signal, with the output signal being supplied to the sensor. The output signal can be used by the sensor to generate the input signal, for example by a simple connecting through of the current of the output signal that is then supplied to the measurement input as an input signal.

The output signal is, for example, generated by a constant current source or by a voltage source (e.g. the energy supply). The output can therefore comprise a constant current source or a voltage source. The output can supply the sensor with electric energy. Alternatively, the sensor can also itself generate the input signal, e.g. by means of its own energy supply that is independent of the PLC.

The measurement input preferably comprises a current sink that limits a maximum current of the input signal to a predefined value. The current sink can therefore provide that the input signal does not exceed a maximum current of e.g. 5 mA, 10 mA or 20 mA.

In accordance with a further advantageous embodiment, a converter is coupled to the measurement input and to the energy supply and supplies at least some of the electric energy of the input signal (or the electric energy available at the measurement input) to the energy supply. The converter can e.g. be a switch converter, in particular a boost converter or a buck-boost converter, a SEPIC converter (single-ended primary inductance converter) and the like. The converter is in particular a DC-DC converter. The converter preferably establishes an electrical connection between the measurement input and the energy supply.

The converter can, for example, comprise a coil that is connected in series to a diode (free-wheeling diode). The coil can establish an electrical connection between the measurement input and the diode. In addition, a switch element (e.g. a transistor) can be provided that draws the electrical connection of the coil and the diode to a lower potential (e.g. ground potential) in a conductive state. The cathode of the diode can be directly electrically connected to a charging capacitor, with the charging capacitor providing an output voltage of the converter. A terminal of the charging capacitor can be electrically directly connected to the low potential (ground potential).

The converter in particular serves to increase (or generally to adapt) a voltage of the input signal such that the input signal can be supplied to the energy supply. The converter preferably comprises a current regulation that keeps the current of the input signal constant and/or limits it. The influence of the converter on the input signal can be kept small by the current regulation since the converter cannot influence the input signal within any limits due to the current limitation. The converter is in particular adapted such that the current of the input signal does not exceed a predefined threshold. The converter can switch off on an exceeding of the threshold value. The converter can likewise switch off when the current of the input signal and/or the electric energy of the input signal exceed(s) a further predefined threshold value. When this threshold value is fallen below or is not reached, an efficient operation of the converter is no longer possible so that the converter is then switched off. The switching off can e.g. take pace by means of a logic gate and/or by means of a comparator, with the comparator comparing a voltage or a current of the input signal with a reference value and regulating the switching frequency of the switch element in dependence on the voltage and/or on the current of the input signal.

A shunt resistor can preferably be connected between the coil and the diode and electrically connects the coil and the diode. The converter can therefore generally comprise a series connection of the coil, of the shunt resistor and of the diode. The switching frequency of the switch element can be regulated on the basis of the voltage dropping at the shunt resistor. If this voltage drops below a predefined threshold value, the switch element is switched off so that the converter is deactivated. The shunt resistor can have a resistance of approximately 50 to 150 ohms.

In accordance with a further advantageous embodiment, the PLC comprises a plurality of measurement inputs that are respectively coupled to a separate converter unit, with each converter unit being electrically connected to the energy supply and supplying at least some of the electric energy of the respective input signals to the energy supply. A converter unit can be the above-explained converter. Alternatively, a converter unit can also only comprise some of the components of a converter and can share further components with other converter units such as shown further below.

In accordance with an embodiment, each of the measurement inputs is electrically connected to the energy supply by means of a separate converter unit so that the converter unit supplies at least some of the electric energy of the respective input signal of the respective measurement input to the energy supply. The measurement inputs are thus each connected in series to respective converter units, with the combination of measurement input and converter unit respectively being connected in parallel with further combinations of measurement input and converter unit. In this case, the converter unit can correspond to the above-explained converter. The statements on the converter then apply accordingly to the converter unit.

In accordance with another embodiment, the converter units are electrically connected to a common charging capacitor, with the charging capacitor electrically connecting the converter unit to the energy supply.

In this embodiment, the converter units can correspond to the above-explained converter, with the difference that every converter unit does not include its own charging capacitor, but rather that a common capacitor is used that is electrically directly connected to the diodes of the converter units. The converter units accordingly comprise e.g. a coil, a switch element, and a diode. The diode separates the individual converter units, and thus also the respective measurement inputs, electrically from one another. The converter units can each be of identical design. The energy of all input signals of all measurement inputs is supplied to the same charging capacitor by the use of the common charging capacitor so that further charging capacitors can be saved.

In accordance with an alternative embodiment, all the measuring inputs can also be electrically connected to a single converter so that the only converter supplies the electric energy of all the input signals to the energy supply.

The converter or the converter units can serve as the above-explained current sink.

In accordance with a further advantageous embodiment, the charging capacitor is electrically connected to the energy supply (e.g. the bus bar) by means of a charging protective diode. The charging protective diode suppresses a charging of the charging capacitor by the energy supply.

The PLC preferably comprises a first detection device and a second detection device that are adapted to measure and/or detect the input signal of the measurement input. The input signal can therefore be evaluated (i.e. measured and/or detected) redundantly by both the first detection device and the second detection device. The PLC can accordingly be a so-called safe unit (a safe PLC).

In accordance with a further advantageous embodiment, the energy supply conducts a DC voltage of 24 V and/or the input signal is a DC current with a power of up to 20 mA. The input signal can likewise have a voltage of 24 V or less than 24 V. A DC voltage of 24 V has been found to be advantageous for the energy supply of the PLC since such a DC voltage can be generated easily using said converter.

A current of at least 5 mA, preferably of at least 10 mA, of the input signal can be required for a safe detection of a high level of the input signal. The current of the input signal can be limited to a maximum of 20 mA.

In accordance with the invention, the electrical unit is a programmable logic controller (PLC). The PLC preferably has a plurality of measurement inputs. The electric energy of the input signals of the measurement inputs can be used to operate the PLC itself or components of the PLC.

The PLC preferably comprises a processing device that controls the operation of the PLC. The processing device can, for example, evaluate the signals measured or detected by the measurement input and communicate them to external actuators. The PLC can have a terminal for a fieldbus (e.g. Sercos 3 or EtherCat) and/or can be coupled to a fieldbus for this purpose.

BRIEF DESCRIPTION OF THE DRAWINGS

The invention will be described in the following purely by way of example with reference to the drawings. There are shown.

DETAILED DESCRIPTION

Figure 1:
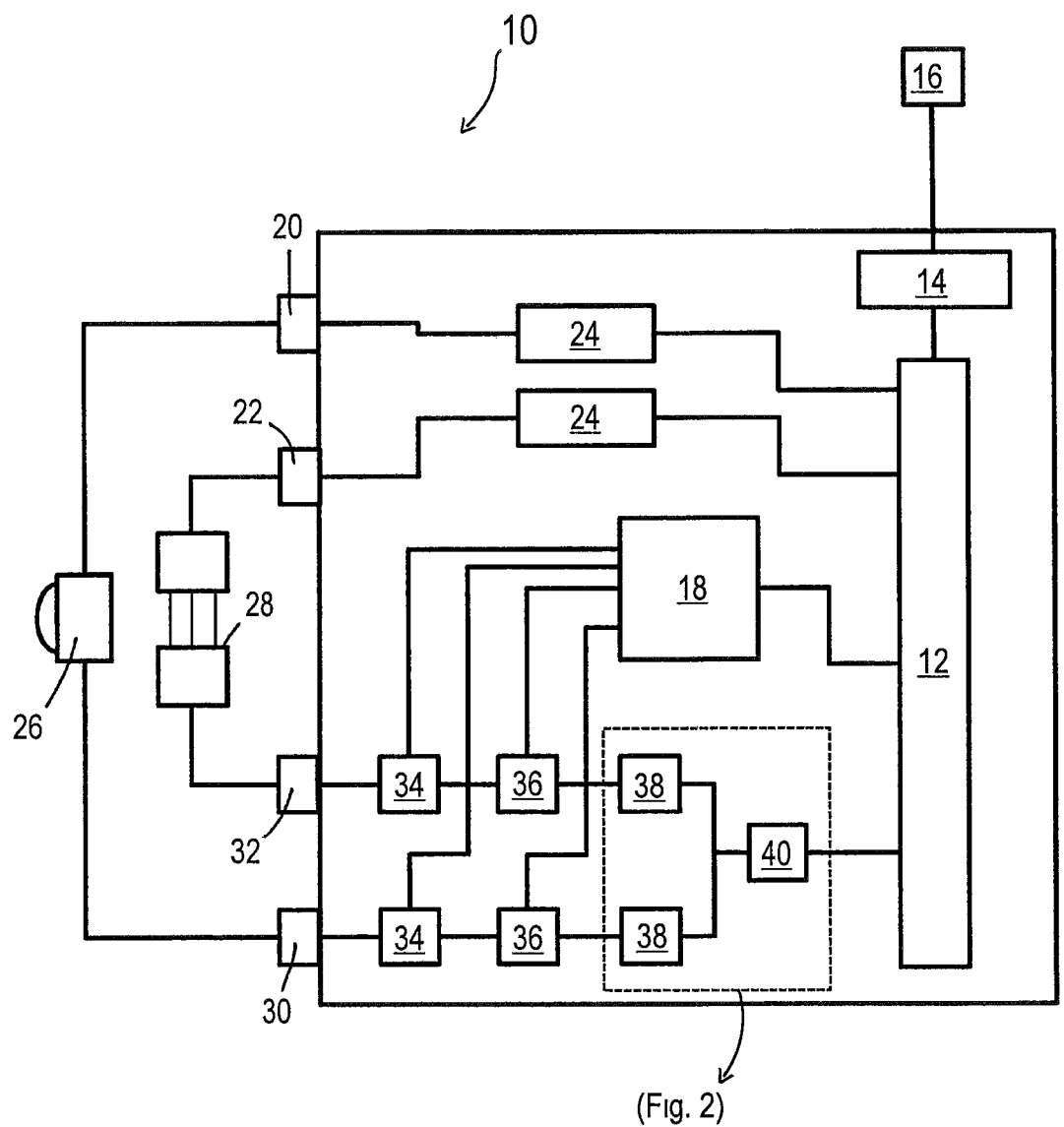
FIG. 1 a schematic view of a programmable logic controller (PLC) with two sensors.

FIG. 1 shows an electrical device that is configured as a programmable logic controller (PLC) 10. The PLC 10 has an energy supply in the form of a bus bar 12. The energy supply comprises a mains adapter 14 that converts a voltage of 230 V of a socket 16 into a DC voltage of 24 V that is then available at the bus bar 12. The mains adapter 14 can—contrary to the arrangement shown in FIG. 1—also be arranged outside the PLC 10. The PLC 10 comprises a control unit 18 in the form of a microprocessor that controls the PLC 10.

The PLC 10 comprises a first output 20 and a second output 22, with a switch 24 that can connect a constant starting voltage of 24 V through to the respective output 20 being associated with each output 20, 22. The switches 24 and the control unit 18 are electrically connected to the bus bar 12 and are supplied with electric energy by the bus bar 12.

The first output 20 is electrically connected to an emergency stop switch 26. The second output 22 is electrically connected to a light grid 28. The emergency stop switch 26 is in turn electrically connected to a first measurement input 30. In a corresponding manner, the light grid 28 is electrically connected to a second measurement input 32.

The emergency stop switch 26 can establish an electrical connection between the first output 20 and the second measurement input 30 when the emergency stop switch 26 is pressed. The light grid 28 establishes an electrical connection between the second output 22 and the second measurement input 22 by means of an evaluation circuit (not shown) when an object is located in the light grid 28.

If the emergency stop button 26 is pressed or if the light grid 28 detects an object, the voltage provided by the respective output 20, 22 is conducted through to the measurement inputs 30, 32. It is alternatively also possible that e.g. with a depressed emergency stop switch an electrical connection between the output 20 and the measurement input 30 is interrupted.

A first detection device 34 and a second detection device 36 are connected downstream of each measurement input 30, 32, with the detection devices 34, 36 being connected in series. The detection devices 34, 36 redundantly evaluate the respective signal applied to the measurement inputs 30, 32 (the input signal) and transmit their evaluation to the control unit 18. Only a small proportion of the electric energy of the input signals is lost in the evaluation.

A respective converter unit 38 is connected in series to the second detection device. The respective converter units 38, that are electrically connected to the first and second measurement inputs 30, 32, are electrically connected to a single charging capacitor 40. The converter units 38 convert the electric energy of the input signals 30, 32 and conduct the electric energy to the charging capacitor 40. The converter units 38 are adapted such that a current of the respective input signal of 5 mA is adopted.

A voltage is generated in the charging capacitor 40 here that approximately corresponds to the voltage in the bus bar 12. The charging capacitor 40 is electrically coupled to the bus bar. The electric energy emanating from the measurement inputs 30, 32 can thus first be buffered in the charging capacitor 40 and can subsequently be supplied to the bus bar 12 to be consumed again in the further operation of the PLC 10.

Figure 2:
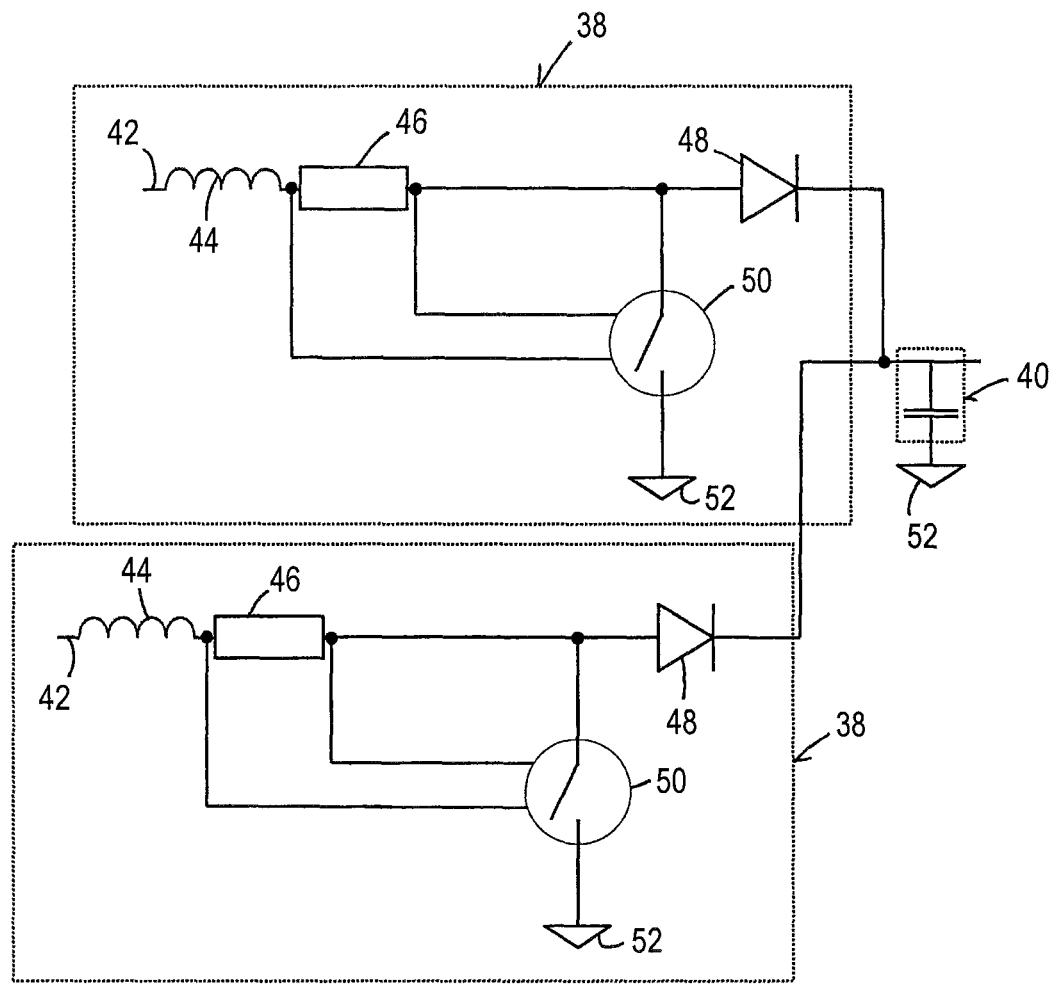
FIG. 2 a schematic representation of two converter units with a common charging capacitor.

FIG. 2 shows the converter units 38 and the charging capacitor 40 in a detailed representation. The converter units 38 are each of identical design and comprise a converter input 42 that is electrically connected to the respective measurement input 30, 32 via the detection devices 34, 36. A coil 44, a shunt resistor 46, and a diode 48 follow the converter input 42 connected in series. The anode of the diode 48 is electrically directly connected to the shunt resistor 46. A regulated switch element 50 (e.g. a transistor) is connected to the anode of the diode 48 and repeatedly establishes an electrical connection between the anode of the diode 48 and the ground potential 52 at a switching frequency of approximately 1 MHz. The cathode of the diode 48 is directly electrically connected to a first terminal of the charging capacitor 40. A second terminal of the charging capacitor is directly electrically connected to the ground potential 52.

The switching frequency of the regulated switch element 50 is regulated on the basis of the voltage dropping at the shunt resistor 46. If this voltage falls below a predefined threshold value, the switch element 50 is switched off (e.g. permanently closed or connected in a conductive manner) so that the converter unit 38 is deactivated. A converter unit 38 together with the charging capacitor 40 can form a converter. A single converter can be used, for example, when the PLC only comprises a single measurement input 30, 32.

Due to the switching frequency of the switch element 50, the electric energy of the input signal that is supplied to the measurement inputs 30, 32 are cyclically displaced into the charging capacitor 40, with a voltage increase simultaneously being achieved so that the charging capacitor 40 has the voltage of the bus bar 12. The electric energy of the input signals can thus be reused, whereby the electrical efficiency of the PLC 10 is increased.

REFERENCE NUMERAL LIST

10 PLC
12 bus bar
14 mains adapter
16 socket
18 control unit
20 first output
22 second output
24 switch
26 emergency stop switch
28 light grid 30 first measurement input
32 second measurement input
34 first detection device
36 second detection device
38 converter unit
40 charging capacitor
42 converter input
44 coil
46 shunt resistor
48 diode
50 regulated switch element
52 ground potential

The invention claimed is:

1. A programmable logic controller, PLC, the PLC comprising an energy supply that provides the electric energy for operating the PLC;
    a plurality of measurement inputs that are each coupled to a separate converter unit, with each converter unit being electrically connected to the energy supply and supplying at least some of the electric energy of the respective input signals to the energy supply; and
    wherein at least one measurement input is configured to measure and/or detect an electrical input signal,
    and wherein the PLC is configured to supply at least some of the electric energy of the input signal to the energy supply.

2. The PLC in accordance with claim 1,
    further comprising a sensor that is electrically connected to the at least one measurement input and that provides the input signal.

3. The PLC in accordance with claim 2,
    further comprising at least one output that is configured to provide an output signal, with the output signal being supplied to the sensor.

4. The PLC in accordance with claim 3,
    wherein the at least one measurement input comprises a current sink that limits a maximum current of the input signal to a predefined value.

5. The PLC in accordance with claim 1,
    wherein a converter is coupled to the at least one measurement input and to the energy supply and supplies at least some of the energy of the input signal to the energy supply.

6. The PLC in accordance with claim 5,
    wherein the converter comprises a current regulation that keeps the current of the input signal constant and/or limits it.

7. The PLC in accordance with claim 1,
    wherein the converter units are connected to a common charging capacitor, with the charging capacitor electrically connecting the converter units to the energy supply.

8. The PLC in accordance with claim 1,
    further comprising a first detection device and a second detective device that are adapted to measure and/or to detect the input signal of the at least one measurement input.

9. The PLC in accordance with claim 1,
    wherein the energy supply conducts a DC voltage of 24 volts.

10. The PLC in accordance with claim 1,
    wherein the input signal is a DC current having a current of up to 20 milliamps.

11. The PLC in accordance with claim 1,
    wherein the energy supply conducts a DC voltage of 24 volts and the input signal is a DC current having a current of up to 20 milliamps.

* * * * *